United States Patent [19]

Oppenlaender et al.

[11] Patent Number: 4,517,114

[45] Date of Patent: May 14, 1985

[54] INHIBITORS AGAINST CORROSION CAUSED BY $CO_2$ AND $H_2S$ IN WATER-IN-OIL EMULSIONS

[75] Inventors: Knut Oppenlaender, Ludwigshafen; Karl Stork, Lampertheim; Klaus Barthold, Mannheim, all of Fed. Rep. of Germany

[73] Assignee: BASF Aktiengesellschaft, Ludwigshafen, Fed. Rep. of Germany

[21] Appl. No.: 526,614

[22] Filed: Aug. 26, 1983

[30] Foreign Application Priority Data

Sep. 4, 1982 [DE] Fed. Rep. of Germany ....... 3232921

[51] Int. Cl.³ .......................... C09K 3/00; C23F 11/00
[52] U.S. Cl. .............................. 252/389 R; 106/14.12; 106/14.16; 106/14.26; 252/8.55 E; 252/388; 422/12
[58] Field of Search ............... 106/14.12, 14.16, 14.26; 252/8.55 E, 388, 389.2; 422/12

[56] References Cited

U.S. PATENT DOCUMENTS

| | | | |
|---|---|---|---|
| 2,944,969 | 7/1960 | Stromberg et al. | 252/8.55 |
| 3,674,804 | 7/1972 | Redmore | 252/8.55 E |
| 3,687,847 | 8/1972 | Maddox et al. | 252/8.55 E |
| 3,891,470 | 7/1975 | Kotone et al. | 252/8.55 E |
| 4,101,441 | 7/1978 | Hwa et al. | 252/389.2 |
| 4,436,639 | 3/1984 | Oppenlaender et al. | 252/8.55 E |

FOREIGN PATENT DOCUMENTS

| | | | |
|---|---|---|---|
| 628235 | 9/1961 | Canada | 252/8.55 E |
| 0896375 | 5/1962 | United Kingdom . | |
| 2010237 | 6/1982 | United Kingdom . | |

*Primary Examiner*—Leland A. Sebastian
*Attorney, Agent, or Firm*—David L. Hedden

[57] ABSTRACT

The subject invention relates to compositions which inhibit the corrosion caused by $CO_2$ and $H_2S$ in the transport and storage of crude oils, which are generally water-in-oil, in particular salt-water-in-oil emulsions. The corrosion inhibitors are mixtures of certain imidazoline or tetrahydropyrimidine derivatives, precursors thereof, or their complexes with sulfur and certain maleinamidic acids.

4 Claims, No Drawings

INHIBITORS AGAINST CORROSION CAUSED BY $CO_2$ AND $H_2S$ IN WATER-IN-OIL EMULSIONS

BACKGROUND OF THE INVENTION

1. Field of the Invention

The subject invention relates to compositions which inhibit the corrosion caused by $CO_2$ and $H_2S$ in the transport and storage of crude oils, which are generally water-in-oil, in particular salt-water-in-oil emulsions. The corrosion inhibitors are mixtures of certain imidazoline or tetrahydropyrimidine derivatives, precursors thereof, or their complexes with sulfur and certain maleinamidic acids.

2. Description of the Prior Art

The common practice when oil is piped, transported, and stored is to inject a solution or dispersion of corrosion inhibitors into the oil so that a protective layer is formed on the surface of metal parts coming in contact with the oil.

German Published Application No. 28 46 977 discloses corrosion inhibitors for these purposes which are comprised of an imidazoline salt, an oil-soluble solvent for the imidazoline salt, and a hydrocarbon oil.

However, it has been found that particularly with salt-water-in-oil emulsions (henceforth shortened to "W/O emulsions") the imidazoline salts described in the above reference still do not sufficiently suppress corrosion due to $H_2S$ and $CO_2$. Furthermore, the use of the imidazolines is complicated here by the fact that they must be used with specific solvents and a hydrocarbon oil; thus, they are expensive to use.

European Patent Application No. 82101713.4, which is a counterpart of German Application P 31 09 827.4, discloses an inhibitor against corrosion caused by $CO_2$ and $H_2S$ in water-in-oil emulsions consisting of the reaction product of (A) compounds or their salts having formula (i)

$$R^1-C\underset{\underset{(CH_2)_nX}{N}}{\overset{N=(CH_2)_n}{\diagup}}$$

or precursors having formula (ii)

$$R^1-\overset{\overset{O}{\|}}{C}-\overset{\overset{H}{|}}{N}-(CH_2)_n-NH-(CH_2)_nX$$

where
$R^1 = C_6$- to $C_{22}$-alkyl or alkenyl
$X = -OH, -NH_2$ or $$[NH_3]^+\left[O=\overset{\overset{O}{\|}}{\underset{\underset{OR^2}{|}}{P}}-OR^2\right]^-$$

$R^2 = C_4$- to $C_{18}$-alkyl,
$n = 2$ and
(B) elementary sulfur.

These inhibitors are generally effective, but their preparation is not energy-efficient due to the necessary incorporation of sulfur, and their effectiveness as inhibitors is not optimum in all cases.

Thus, there is a need to develop improved inhibitors which will provide increased protection against corrosion caused by $H_2S$ and $CO_2$, primarily in salt-water-in-oil emulsions.

SUMMARY OF THE INVENTION

The subject invention relates to compositions which inhibit corrosion caused by $CO_2$ and $H_2S$ in water-in-oil emulsions comprising a mixture of (A) a compound selected from the group consisting of
(i) a compound or salt thereof having the formula $$R^1-C\underset{\underset{(CH_2)_nX}{N}}{\overset{N=(CH_2)_n}{\diagup}}$$

(ii) a precursor of (i) having the formula $$R^1-\overset{\overset{O}{\|}}{C}-\overset{\overset{H}{|}}{N}-(CH_2)_n-NH-(CH_2)_nX$$

in which
$R^1 = C_6$ to $C_{22}$ alkyl or alkenyl;
$X = -OH, -NH_2$ or $$[NH_3]^+\left[O=\overset{\overset{O}{\|}}{\underset{\underset{OR^2}{|}}{P}}-OR^2\right]^-$$

$R^2 = C_4$ to $C_{18}$ alkyl;
$n = 2$ or 3; and (B) a maleinamidic acid having the formula $$R^3-NH-\overset{\overset{O}{\|}}{C}-\overset{\overset{H}{|}}{C}=\overset{\overset{H}{|}}{C}-COOH$$

in which $R^3$ is a saturated or unsaturated $C_8$ to $C_{22}$ alkyl,
wherein the ratio of A:B is from 1:4 to 4:1.

The mixtures, which can be added to the W/O emulsions in unaltered form, offer increased protection against $H_2S$—and $CO_2$ corrosion when compared to the products of European Patent Application No. 82101713.4. Moreover, depending on the origin or composition of the crude oil emulsion, these mixtures can be used in amounts ranging from 10 to 100 ppm based on the emulsion, which is significantly lower than the amount which could be used if the components of the mixture were used alone.

DESCRIPTION OF THE PREFERRED EMBODIMENTS

Component A of the subject mixture is an imidazoline or tetrahydropyrimidine derivative having formula (i) or its precursor having formula (ii).

In these formulae $R^1$ is a long-chain alkyl or alkenyl residue with from 6 to 22 carbon atoms, preferably 8 to 17; X is hydroxyl, an amino group, or an ammonium salt group of a dialkyl ester of orthophosphoric acid prepared from alcohols having carbon atoms containing from 4 to 18 carbon atoms; preferably from 7 to 17 carbon atoms; and n is 2 or 3.

The preparation of the imidazoline or tetrahydropyrimidine derivative, or precursors thereof, is shown in the prior art and needs no detailed explanation. The standard procedure is to react an acid of the formula $R^1COOH$, wherein $R^1$ has the same meaning as for formula (i), with diethylenetriamine, dipropylenetriamine, aminoethylethanolamine or aminopropylpropanolamine at approximately 130° C. to 170° C., to produce the acid amide having formula (ii), which can be used itself as component A.

The reaction may then be continued at approximately 190° C. to 250° C. to prepare the imidazoline or the tetrahydropyrimidine derivatives. This product can then by further reacted with the dialkyl ester of orthophosphoric acid to produce the ammonium salt if the acid has been reacted with diethylene triamine or dipropylene triamine in the first step.

Acids of formula $R^1COOH$ include, for example, 2-ethylhexanoic acid, nonoic acid, oleic acid, stearic acid, lauric acid, elaidic acid, or mixtures of natural fatty acid such as natural cocinic acid or natural stearic acid.

The principal diesters of orthophosphoric acid are those derived from amyl alcohol, n-hexanol, n-heptanol, n-octanol, 2-ethylhexanol, nonanols, decanols, isotridecanol, stearyl alcohol, oleyl alcohol, or the $C_9/C_{11}$- and $C_{13}/C_{15}$- cuts from the oxosynthesis. The $C_8/C_{10}$-/-, $C_{10}C_{12}$- and $C_{14}/C_{16}$-alcohol mixtures resulting from Ziegler synthesis can also be used in preparing the orthophosphoric diester.

Especially useful are compounds or their phosphate ester salts derived from the $C_{12}$- to $C_{20}$-carboxylic acids, for example, compounds of formulae

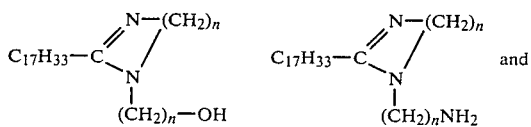

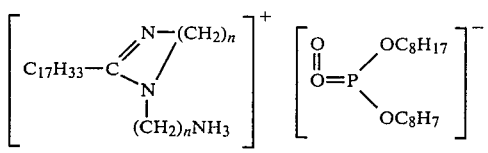

where n is 2 or 3, as well as the corresponding $C_{17}H_{35}$ analogues.

Optionally, the imidazoline and tetrahydro pyrimidine derivatives or their precursors can then be mixed with sulfur, most appropriately in colloidal form, (i.e., as a sulfur sublimate) and can then be reacted for from 1 to 3 hours upon heating from 100° C. to 200° C. As a reactant, the sulfur is soluble together with the imidazoline derivatives. The imidazoline- or tetrahydropyrimidine-to-sulfur weight ratio can be from 100:1 to 2:1, preferably from 100:1 to 4:1.

Component B is a maleinamidic acid. Maleinamidic acids are in themselves known as corrosion inhibitors. Such acids are represented by the formula $$R^3-NH-\overset{O}{\overset{\|}{C}}-\overset{H}{\overset{|}{C}}=\overset{H}{\overset{|}{C}}-COOH$$

wherein $R^3$ is a $C_8$- to $C_{22}$-, preferably a $C_{10}$- to $C_{16}$-, alkyl or alkenyl residue, for example, decyl-, undecyl-, dodecyl-, tridecyl-, hexadecyl- or a corresponding simple unsaturated radical. More preferred are decyl-, dodecyl-, pentadecyl- and tridecyl-radical having straight and branched chain structures.

A and B are mixed in an A:B ratio of from 1:4 to 4:1, preferably from 1:2 to 2:1, appropriately upon heating to from approximately 60° C. to approximately 80° C., and are then diluted, in some cases, with a solvent such as xylene or toluene to a usable form (for better metering).

The invention is illustrated in more detail by the following examples.

EXAMPLES

A dynamic test (a so-called "wheel test") was performed to test the inhibitor preparations. This method is used for testing corrosion inhibitors for petroleum and natural gas pipeline systems. Steel sheet metal of dimensions 130 mm×10 mm×1 mm was used for the test coupons. These coupons were sanded, degreased with toluene, and weighed. "White spirits" according to DIN 51 632 containing salt water with 3 percent NaCl, based on the water, in emulsified form was used as the test liquid. The emulsion contained 50 percent by weight of salt water and was saturated with $H_2S+CO_2$. Then 250 ppm of the inhibitor, based on the weight of the emulsion, was added.

The degreased and weighed test specimens were then placed in the emulsions and subjected to mechanical motion (40 rpm by means of a shaft turning the test containers) for 16 hours at 80° C.

The sheet metal test specimens were then cleaned with an inhibiting acid, degreased, dried and weighed to determine the loss in weight. Evaluation was made by comparison with a control sample (test without the addition of a corrosion inhibitor). The rate of corrosion (60) was calculated from the data generated by the weighings and the percent of corrosion protection (Z) was calculated as follows:

$$Z=(G_o-G_1/G_o)\cdot 100\ (\%),$$

where $G_o$ is the rate of corrosion without the inhibitor and $G_1$ is the rate of corrosion with the inhibitor.

The results are shown in Tables I to IV.

The samples marked with an asterisk (*) represent those within the scope of this invention and are mixtures with an A:B ratio of 1:1 where component B is the monoisotridecylamide of maleic acid. The samples which are not marked with an asterisk contain only component A as the corrosion inhibitor.

TABLE I

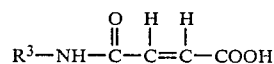

Compound: Concentration: 250 ppm

| Sample | $R^1$ | X | S (%) | Z (%) |
|---|---|---|---|---|
| Blind Sample | — | — | — | 0 |

TABLE I-continued

Compound: 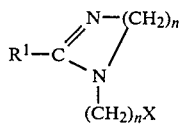   Concentration: 250 ppm

| Sample | R¹ | X | S (%) | Z (%) |
|---|---|---|---|---|
| 1 | $C_{17}H_{33}$ | OH | 0 | 26.0 |
| 2 | i-$C_8H_{17}$ | $NH_2$ | 1/5/10 | 66.1/69.4/70.7 |
| 3 | $C_{17}H_{33}$ | $NH_2$ | 5/20 | 72.7/75.1 |
| 4 | $C_{17}H_{33}$ | OH | 15/20/30 | 76.7/80.2/82.4 |
| 1* | $C_{17}H_{33}$ | OH | 0 | 89.2 |
| 2* | i-$C_8H_{17}$ | $NH_2$ | 1/5/10 | 87.4/88.2/89.0 |
| 3* | $C_{17}H_{33}$ | $NH_2$ | 5/20 | 89.3/90.1 |
| 4* | $C_{17}H_{33}$ | OH | 15/20/30 | 88.9/91.2/92.0 |

TABLE II

Compound: 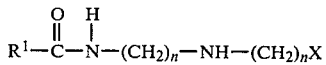   Concentration: 250 ppm

| Sample | R¹ | X | S (%) | Z (%) |
|---|---|---|---|---|
| Blind Sample | — | — | — | 0 |
| 1 | $C_{17}H_{33}$ | OH | 0 | 19.5 |
| 2 | $C_{17}H_{33}$ | OH | 5/10/15 | 58.5/63.5/67.6 |
| 1* | $C_{17}H_{33}$ | OH | 0 | 84.5 |
| 2* | $C_{17}H_{33}$ | OH | 5/10/15 | 85.0/87.0/90.1 |

TABLE III

Compound: 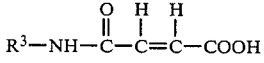
Concentration: 250 ppm

| Sample | R¹ | X | n | S (%) | Z (%) |
|---|---|---|---|---|---|
| Blind Sample | — | — | — | — | 0 |
| 1 | Stearyl | OH | 2 | 0 | 42.0 |
| 2 | " | $NH_2$ | 2 | 0 | 68.3 |
| 3 | " | OH | 2 | 5/10/30 | 56/77/79.5 |
| 4 | " | $NH_2$ | 2 | 1/5/10 | 72.5/75.5/75.8 |
| 5 | $C_{17}H_{33}$ | $NH_2$ | 2 | 1/5/10 | 74.5/76.5/77.8 |
| 6 | " | $NH_2$ | 2 | 0 | 16.6 |
| 7 | Stearyl | OH | 3 | 0 | 53.8 |
| 8 | " | $NH_3$ | 3 | 0 | 59.3 |
| 9 | " | OH | 3 | 1/5 | 69.1/74.5 |
| 10 | " | $NH_2$ | 3 | 1/5 | 75.0/81.6 |
| 1* | | | | | 84.3 |
| 2* | | | | | 89.7 |
| 3* | | | | | 88.0/89.5/90.0 |
| 4* | | | | | 86.7/92.0/92.8 |
| 5* | (R', X, n and S | | | | 87.5/89.6/91.4 |
| 6* | corresponding to 1 through 10) | | | | 85.8 |
| 7* | | | | | 82.3 |
| 8* | | | | | 92.8 |
| 9* | | | | | 82.3/88.0 |
| 10* | | | | | 84.2/86.2 |

Tables I–III demonstrate that the mixtures within the scope of this invention, i.e., those containing components A and B, are more effective as corrosion inhibitors than when component A is used alone.

COMPARISON EXAMPLE

In this comparison example, only a maleinamidic acid alone was used as a corrosion inhibitor. The particular maleinamidic acid used was the monosotridecylamide of maleic acid in a concentration of 250 ppm. The amount of corrosion caused when tested with various contaminants is shown in Table IV which follows.

TABLE IV

Compound: Monoisotridecylamide of maleic acid
Concentration: 250 ppm

| Corrosion due to | Z (%) |
|---|---|
| $H_2S$ | 40 |
| $CO_2$ | 67 |
| $H_2S + CO_2$ | 60 |

A comparison of Table IV with Tables I to III suggests that the mixture of compounds within the subject invention are more effective as corrosion inhibitors than maleinamidic acids alone.

The embodiments of the invention in which an exclusive privileage or property is claimed are defined as follows:

1. An inhibitor against corrosion caused by $CO_2$ and $H_2S$ in water-in-oil emulsions comprising a mixture of
(A) a compound selected from the group consisting of
(i) a compound or salt thereof having the formula

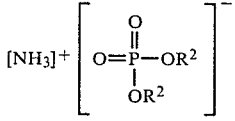

(ii) a precursor of (i) having the formula $$R^1-\overset{O}{\underset{\|}{C}}-\overset{H}{\underset{|}{N}}-(CH_2)_n-NH-(CH_2)_nX$$

in which
$R^1 = C_6$ to $C_{22}$ alkyl or alkenyl;
$X = -OH, -NH_2$ or $$[NH_3]^+ \begin{bmatrix} O=\overset{O}{\underset{|}{\overset{\|}{P}}}-OR^2 \\ OR^2 \end{bmatrix}^-$$

$R^2 = C_4$ to $C_{18}$ alkyl, n = 2 or 3; and
(B) a maleinamidic acid having the formula $$R^3-NH-\overset{O}{\underset{\|}{C}}-\overset{H}{\underset{|}{C}}=\overset{H}{\underset{|}{C}}-COOH$$

in which $R^3$ is a saturated or unsaturated $C_8$ to $C_{22}$ alkyl,
wherein the ratio of A:B is from 1:4 to 4:1.

2. The inhibitor of claim 1 wherein component A is selected from the group consisting of

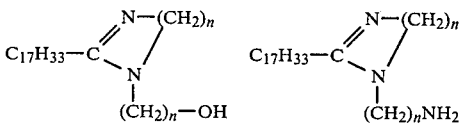

-continued
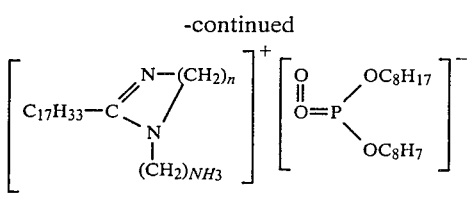
wherein n is 2 or 3, as well as the corresponding $C_{17}H_{35}$ analogues.
3. The inhibitor of claim 2 wherein component B is the monoisotridecylamide of maleic acid.
4. The inhibitors of claim 1 where component A is reacted with elementary sulfur at 100° C. to 200° C. in a ratio of 100:1 to 2:1.
* * * * *